June 9, 1964　　A. C. LAWRENCE　　3,136,447
STEAM GENERATORS
Filed Jan. 31, 1962
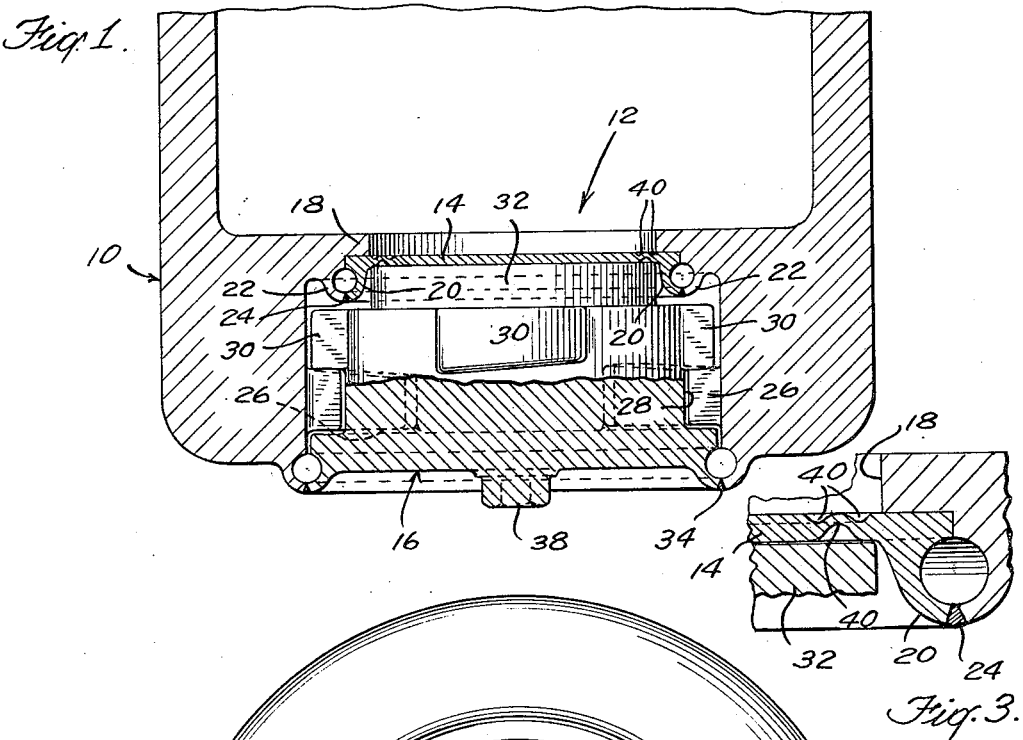
Fig. 1.
Fig. 3.
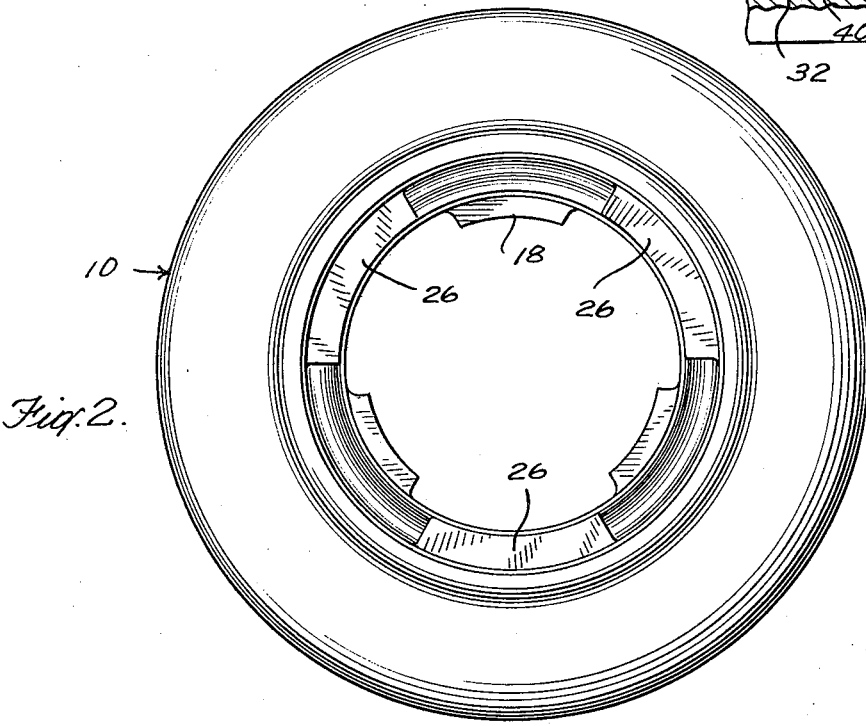
Fig. 2.
INVENTOR
A. C. LAWRENCE
BY
Richard H. Thomas
ATTORNEY

United States Patent Office 3,136,447
Patented June 9, 1964

3,136,447
STEAM GENERATORS
Arthur Charles Lawrence, West Molesey, Surrey, England, assignor to Foster Wheeler Corporation, New York, N.Y., a corporation of New York
Filed Jan. 31, 1962, Ser. No. 170,102
7 Claims. (Cl. 220—46)

This invention relates to closures for heat exchangers and in particular to closures for nuclear steam generators.

Pressure vessels, for instance those in the primary circuit of a pressurized water reactor, have to be provided with access holes, and the provision of suitable closures therefor presents difficulties, particularly in such primary reactor circuits. Among these is the necessity for maintaining adequate sealing, for avoiding cracks and crevices which may become contaminated with radio-active material, insuring adequate resistance to thermal shock and insuring ease of removal. In addition, of course, the closures must be compact.

These conditions are met by the use of a closure comprising a diaphragm which is seal welded to the pressure vessel within the access hole and a plug which can be inserted into the access hole so as to provide a backing for the diaphragm and resist the internal pressure in the vessel.

More specifically, by the invention, there is provided a number of small lugs in the opening of the vessel depending from or projecting from the wall of the opening and defining with the wall an L-shaped emplacement or seat in the opening into which the diaphragm is inserted, the circumferential surface of the diaphragm making a close fit with the opening wall. The diaphragm is provided with a peripheral flange which cooperates with and is welded to an opposing flange on the opening wall to form a toroidal seal. A preferred means for retaining and positioning the backing plug comprises cooperating lugs depending from the opening wall and on the plug having facing oppositely sloping surfaces to bring the backing plug to bear on the diaphragm in a screw-like manner when rotated, and also to bring the mating surfaces of the lugs into tight frictional engagement when rotated.

Other aspects of the invention will become apparent on consideration of the following description, with reference to the accompanying drawings, in which:

FIGURE 1 is a sectional view of one end of a pressure vessel;

FIGURE 2 is an end view of FIG. 1 with the closure removed; and

FIGURE 3 illustrates the diaphragm of an embodiment of the invention.

The pressure vessel 10 shown in the drawings is formed with an access hole or opening 12 which is closed by a circular diaphragm 14 and a backing plug 16.

For fixing the diaphragm in position, the access hole is provided at its inner end with small lugs 18 depending from the wall of the hole and defining with the wall an L-shaped annular emplacement or seat for the diaphragm. The diaphragm has a depending peripheral flange 20, and a complementary peripheral flange 22 is formed in the access hole, which flanges together form the two cooperating parts of a toroid. The fixing of the diaphragm in the hole is effected by a weld 24 which can be made from the outside before the plug 16 is inserted.

For securing the plug in place, the access hole in the pressure vessel 10 is provided with a number of lugs 26 projecting into the hole, and the plug is formed with a groove 28 bounded on the upper or inner side by a number of lugs 30 which are adapted to pass through the spaces between the lugs 26 in the access hole. The upper and lower mating surfaces of the lugs 26 and 30 are sloped in the manner of screw threads so that when the plug is inserted in the hole and rotated therein, the mating surfaces of the lugs 26 and 30 will be forced into tight frictional engagement with each other.

Inside the lugs 26, and axially positioned above the lugs 30, the plug 16 is provided with an inner raised surface or projection 32 which, when the lug is rotated into position, comes to bear on and lies immediately behind the diaphragm for supporting the diaphragm against the internal pressure in the vessel 10.

The plug may be toroidally welded to the pressure vessel at 34 to seal the space between it and the pressure vessel, or locking means may be provided between these parts.

The closure described above has the desirable features referred to, namely that cracks and crevices of conventional closures are avoided, and that the device may readily and easily be sealed. Further the diaphragm and plug combination is capable of withstanding thermal shocks, and may be easily removed to obtain access to the inside of the vessel. The arrangement is compact and the plug is fully able to resist the pressure in the vessel because it is positively supported by the lugs 26.

Specifically, the diaphragm, which is held against undue flexing by the plug, provides a superior seal. The weld 24, by which it is fixed to the pressure vessel is easily effected as the periphery of the diaphragm is accessible from the outside before the plug is inserted in the access hole. It almost completely eliminates the possibility of a crack or crevice occurring within the pressure vessel.

Removal of the closure is easy to effect as it involves only cutting out the welds 34 and 24. To assist in inserting and removing the plug, the latter can be provided with a bolt head or the equivalent as shown at 38.

The diaphragm can, with advantage, be provided with circular grooves 40, FIG. 3, in its top and bottom faces near its periphery. These increase its flexibility and thus ensure that it will not become permanently deformed by distortion during welding, and also allow it to be pressed against the plug by the pressure in the vessel without stressing the weld. Such grooves also improve on the ability of the closure to withstand thermal shocks.

Many modifications will be apparent to those skilled in the art, and the invention is to be interpreted as defined in the following claims:

What is claimed is:

1. In a pressure vessel having an access opening therein, the combination comprising spaced lugs projecting from the wall of said opening defining an approximately L-shaped seat in said opening, a closure member comprising a diaphragm seated on said lugs and forming a close fit with the surfaces of said seat, said diaphragm having a peripheral flange cooperating with said opening wall and weld sealed to said wall, a backing plug of substantially greater thickness than said diaphragm, and means in said opening for retaining and positioning said plug so that it provides a backing and support for said diaphragm against the internal pressure of said vessel.

2. In a pressure vessel having a wall defining an access opening, the combination comprising a first series of spaced lugs projecting radially from the wall of said vessel into said opening, a second series of spaced lugs also projecting from said wall into said opening but removed from said first series in a direction towards the mouth of the opening, and a closure arrangement including a diaphragm seated on said first set of lugs and forming a close fit with said opening wall, said diaphragm being weld sealed around the periphery thereof with a cooperating surface of said wall, said closure arrangement further including a backing plug having peripheral lugs arranged to seat between said first series and said second series of spaced lugs in the vessel opening and to engage said second series of lugs, said plug having a backing surface on the inner side thereof, the engaged lugs having opposed oppositely sloped surfaces in the manner of screw threads arranged to bring the backing surface to bear on said diaphragm in a screw-like manner when the plug is rotated into place.

3. In a pressure vessel having a wall defining an access opening, the combination comprising spaced lugs projecting from the wall of said opening, defining an L-shaped seat in said opening a diaphragm seated on said lugs and forming a close fit with the surface of said seat, said diaphragm having a peripheral flange cooperating with said opening wall and weld sealed to said wall, a backing plug having a flat inner surface and a thickness substantially greater than that of said diaphragm, and means to retain and position said plug so that said inner surface is brought to bear on said diaphragm.

4. A vessel according to claim 3 wherein said wall of said opening is provided with an annular flange cooperating with said diaphragm flange to form a toroid configuration, said diaphragm being welded to said opening wall at the junction between said flanges.

5. A vessel according to claim 4 wherein said plug is also sealed by a weld defining a toroid configuration with said vessel.

6. In a pressure vessel according to claim 3 wherein said diaphragm is provided with annular grooves on the inner and outer surfaces thereof to increase the flexibility of the diaphragm and to permit it to be deformed without stressing the weld.

7. In a pressure vessel having a wall defining an access opening, the combination comprising spaced lugs projecting from the wall of said opening defining an L-shaped seat in said opening, a diaphragm seated on said lugs and forming a close fit with the surface of said lugs, said diaphragm having a peripheral flange cooperating with said opening wall and weld sealed to said wall, a backing plug having a flat inner surface and a thickness substantially greater than that of said diaphragm, said backing plug and opening wall having spaced cooperating lugs and opposing surfaces arranged whereby said lugs will be forced into tight frictional engagement when said plug is rotated, said plug flat inner surface also being positioned to provide support for said diaphragm against the internal pressure of said vessel when the plug is rotated into tight frictional engagement.

References Cited in the file of this patent

UNITED STATES PATENTS

| | | |
|---|---|---|
| 75,639 | McMaster | Mar. 17, 1868 |
| 174,773 | Brooke | Mar. 14, 1876 |
| 2,487,104 | Cooper | Nov. 8, 1949 |
| 2,805,789 | Kreh, Jr. et al. | Sept. 10, 1957 |
| 2,888,250 | Tinker | May 26, 1959 |
| 2,903,153 | Root | Sept. 8, 1959 |
| 3,062,401 | Needham | Nov. 6, 1962 |